United States Patent [19]
Millington

[11] Patent Number: 5,857,686
[45] Date of Patent: Jan. 12, 1999

[54] OFFSET SULKY

[76] Inventor: Howard George Millington, 320 Finch, Urbana, Ohio 43078

[21] Appl. No.: 45,999

[22] Filed: Mar. 23, 1998

[51] Int. Cl.$^6$ ....................................................... B62B 3/00
[52] U.S. Cl. ................................. 280/63; 280/64; 280/65
[58] Field of Search ................................. 280/63, 64, 66, 280/68, 70, 71, 72, 73, 74, 75, 76

[56] References Cited

U.S. PATENT DOCUMENTS

| | | |
|---|---|---|
| 3,771,810 | 11/1973 | Barnett . |
| 3,907,325 | 9/1975 | Gaines . |
| 4,033,598 | 7/1977 | King . |
| 4,071,257 | 1/1978 | Discount . |
| 4,078,829 | 3/1978 | Davis . |
| 4,095,815 | 6/1978 | Mitchell . |
| 4,313,611 | 2/1982 | Heinze . |
| 4,326,367 | 4/1982 | Chashman . |
| 4,625,981 | 12/1986 | Marchionne . |
| 4,817,975 | 4/1989 | Saraydar . |
| 4,863,180 | 9/1989 | Guarino . |
| 4,993,728 | 2/1991 | Coporcaro . |
| 5,056,301 | 10/1991 | Garland . |
| 5,062,652 | 11/1991 | Burke . |
| 5,183,279 | 2/1993 | Acerno . |
| 5,308,092 | 5/1994 | Kiraly . |
| 5,607,170 | 3/1997 | Capjon . |

Primary Examiner—Russell D. Stormer
Assistant Examiner—Clovia Hamilton
Attorney, Agent, or Firm—Mark A. Navarre

[57] ABSTRACT

An improved horse drawn sulky for harness racing, which is inexpensive to manufacture, and which compensates for the lateral forces caused by banking of the track and turning. The frame of the sulky is formed so that the wheel on the outside of the track is forwardly offset relative to the wheel on the inside of the track. In addition, the frame affords each wheel a camber which more nearly aligns the wheels with the surface of the track. The simple offset design improves traction on a banked track and improves tracking in turns.

8 Claims, 1 Drawing Sheet

OFFSET SULKY

FIELD OF THE INVENTION

This invention relates to a horse drawn sulky for use in harness racing, and more particularly to an improved sulky structure which compensates for the bank angle of the race track.

BACKGROUND OF THE INVENTION

In general, a harness racing sulky comprises a lightweight frame mounted on a pair of wheels, the frame including a pair of shafts which extend forward of the wheels for attachment to a harness worn by the horse. The driver sits on a seat mounted on the frame between the two wheels.

Most sulkies are designed as though they would be operated in a straight line on a flat track. In reality, of course, the race tracks are always banked, and include turns. In addition, the natural gait of a horse includes a lateral (side-to-side) component, even on straight sections of the track. The lateral component is greatest in a turn, where the horse must change the direction of the sulky. These lateral forces, combined with the bank of the track, result in a loss of traction between the sulky wheels and the track, causing the sulky to work against the horse. Ultimately, the driver's lap time is increased, and the horses tend to develop leg joint ailments.

Others have recognized this problem, and have attempted to address it through relatively complicated frame and suspension arrangements, including steerable wheels and compliant joints between the shafts and the other members of the frame. Representative prior art designs are set forth in the Saraydar U.S. Pat. No. 4,817,975, Guarino et al. U.S. Pat. No. 4,863,180, and Acerno et al. U.S. Pat. No. 5,183,279, for example. In general, however, these arrangements tend to be fairly complicated mechanically, and have not enjoyed widespread acceptance in the marketplace.

SUMMARY OF THE INVENTION

The present invention is directed to an improved horse drawn sulky for harness racing, which is inexpensive to manufacture, and which compensates for the lateral forces caused by banking of the track and turning. According to this invention, the frame of the sulky is formed so that the wheel on the outside of the track is forwardly offset relative to the wheel on the inside of the track. In addition, the frame affords each wheel a camber which more nearly aligns the wheels with the surface of the track. The offset design is simple to manufacture, and in experimental trials, I have found that it has improved traction on a banked track and improved tracking in turns. As a result, the driver can more easily control the horse, and the lap times are significantly improved.

BRIEF DESCRIPTION OF THE DRAWINGS

The above and other advantages of the invention will become more apparent from the following description taken in conjunction with the accompanying drawings wherein like references refer to like parts and wherein.

DETAILED DESCRIPTION OF THE INVENTION

Figure 2:
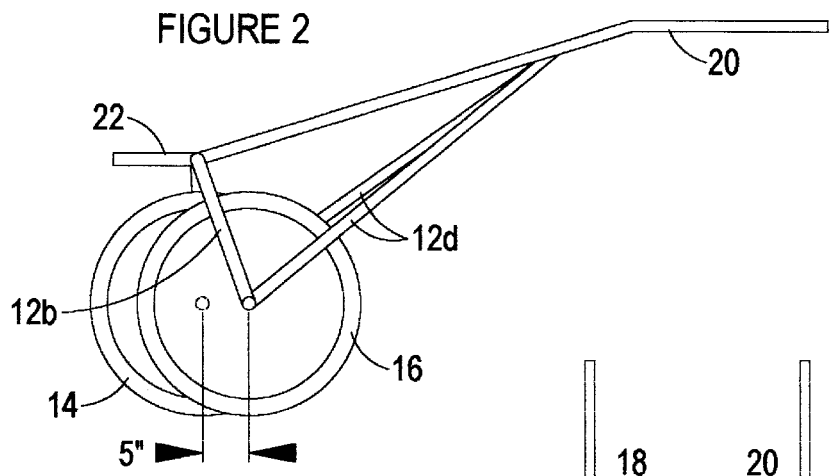
FIG. 2 is a side view of the sulky of FIG. 1.
Figure 3:
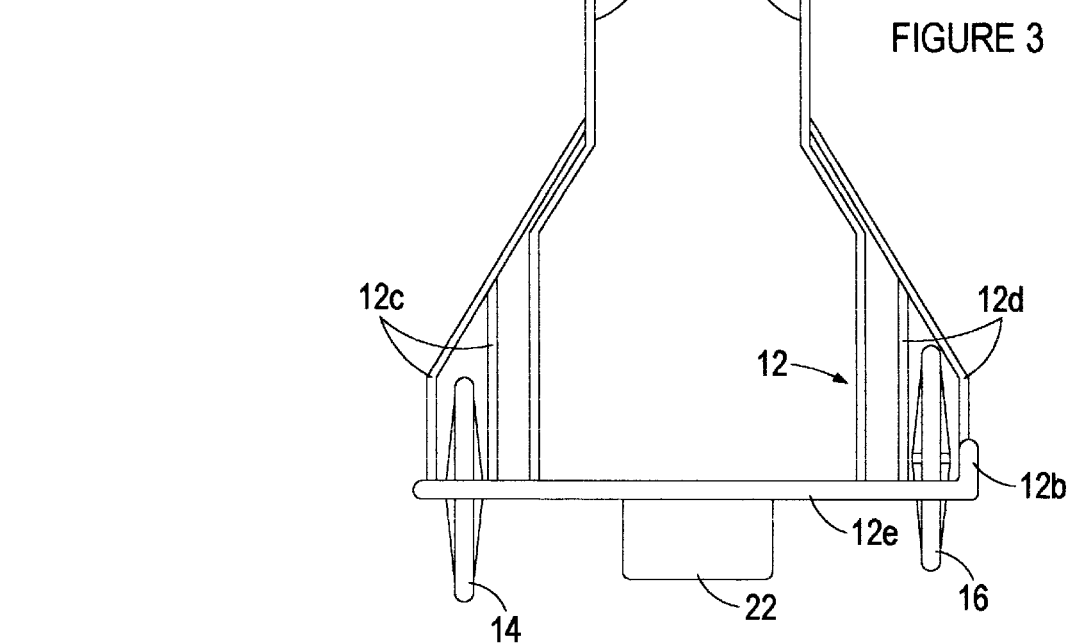
FIG. 3 is a top view of the sulky of FIG. 1.

Referring to the drawings, the reference numeral 10 generally designates a sulky, comprising frame 12 and a pair of rubber tired wheels 14 and 16. Downwardly extending portions 12a, 12b of frame 12 are secured to axles (not shown) of the individual wheels, in the manner of a bicycle, and brace portions 12c, 12d couple the portions 12a, 12b to a pair of forwardly extending shafts 18, 20. A lateral frame section 12e between the frame portions 12a, 12b supports a driver seat 22, as best seen in FIGS. 2–3. The forwardly extending shafts 18, 20 are adapted to straddle the sides of a horse 24. Although not shown in detail, the shafts 18, 20 are secured to a harness worn by the horse 24; an arrangement in common usage is the so-called quick hitch, shown and described in the to Kiraly U.S. Pat. No. 5,308,092, which patent is incorporated herein by reference.

Figure 1:
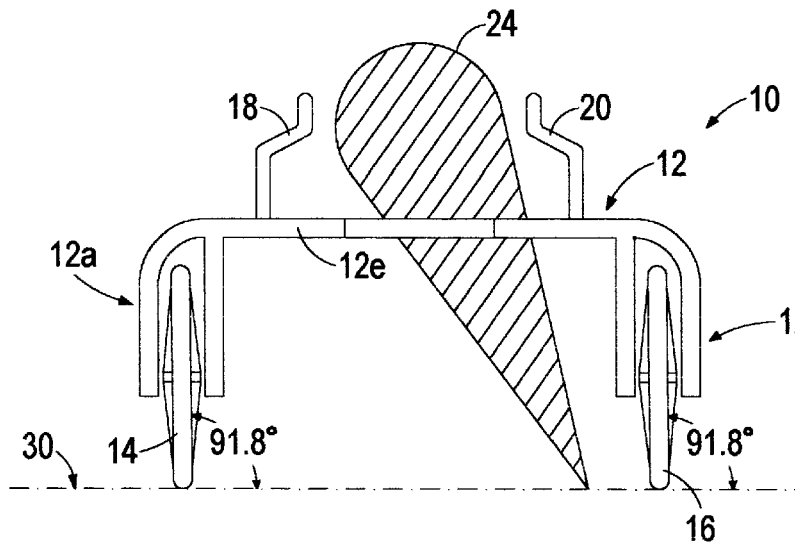
FIG. 1 is a rear view of a sulky according to this invention.

In FIG. 1, the sulky 10 and horse 24 are depicted on the surface 30 of a race track. In straight sections, the track is typically banked 3–5 degrees to afford good drainage, while in curved sections, the track may be banked by 10–15 degrees. For purposes of this description, it will be understood that the track is closed, and in the shape of an oval, and that it is traversed counter-clockwise, as indicated by the angled depiction of horse 24. Thus, the wheel 14 is referred to as the inside wheel, in that it is positioned closest to an inside portion of a closed track; and the wheel 16 is referred to as the outside wheel, in that it is positioned furthest from the inside portion of the track.

While the banking and the lateral movements of the horse 24 ordinarily prevent a sulky from properly tracking the horse, as described above, a sulky according to this invention includes two features that compensate for the bank angle, and significantly improve the tracking of the sulky. The principal feature, shown best in FIGS. 2–3, is that the outside wheel (wheel 16) is forwardly offset relative to the inside wheel (wheel 14). The offset, approximately five (5) inches in the illustrated embodiment, is easily achieved during manufacture of the sulky 10 by angling the frame portion 12b forwardly, as best seen in the side view of FIG. 2. In addition, the frame portions 12a and 12b are formed such that both wheels 14, 16 are cambered toward the outside of the track by approximately 1.8 degrees from a plane normal to the track, as indicated in FIG. 1. In experimental trials, I have found that these features significantly improve the tracking of a sulky on a typical race track, especially in the turns. The improvement is readily apparent to the driver, since the horse is more easily controlled in the turns, and the lap times have been significantly reduced as a result.

While my invention has been described in reference to the illustrated embodiment, it will be understood that various modifications will occur to those skilled in the art. For example, the amount of offset may be changed somewhat to accommodate the specific geometry of a given race track or hitch design. Thus, the disclosed offset of 5 inches is not necessarily considered to be optimal for a specific race track, and a certain degree of variability is assumed; in practice, it is expected that the optimal offset will lie in the range of 3–8 inches. Nevertheless, the experimental trials which verified the improvements discussed above were conducted with a sulky having the disclosed outside wheel offset and camber. Accordingly, it should be understood that sulkies incorporating such modifications may fall within the scope of this invention, which is defined by the appended claims.

The embodiments of the invention in which an exclusive property or privilege is claimed are defined as follows:

1. A sulky drawn by a horse around a closed track, comprising:

first and second tired wheels resting on a surface of the track; and a frame mounted on said first and second wheels, and having forwardly extending shafts adapted to be secured to a horse, the sulky being oriented such that the second wheel is positioned further from an inside portion of said closed track relative to said first wheel, and said frame being configured such that said second wheel is forwardly offset relative to said first wheel.

2. A sulky as defined in claim 1, wherein said frame is additionally configured such that said first and second wheels are cambered away from said inside portion of the track.

3. A sulky as defined in claim 2, wherein said first and second wheels are cambered at an angle of approximately 1.8 degrees from a plane normal to said track.

4. A sulky as defined in claim 1, wherein said second wheel is forwardly offset relative to said first wheel by a distance of approximately five (5) inches.

5. A sulky drawn by a horse around a closed track, comprising:

first and second tired wheels resting on a surface of the track; and a frame having forwardly extending shafts adapted to be secured to a horse, a laterally extending portion joined to said shafts and supporting a driver seat, and first and second downwardly extending portions at opposing ends of said laterally extending portion secured to said first and second wheels, respectively, the sulky being oriented such that the second wheel is positioned further from an inside portion of said closed track relative to said first wheel, said second downwardly extending frame portion being forwardly extended relative to said first downwardly extending frame portion so that said second wheel is forwardly offset relative to said first wheel.

6. A sulky as defined in claim 5, wherein said first and second downwardly extending frame portions are configured such that said first and second wheels are cambered away from said inside portion of the track.

7. A sulky as defined in claim 6, wherein said first and second wheels are cambered at an angle of approximately 1.8 degrees from a plane normal to said track.

8. A sulky as defined in claim 5, wherein said second wheel is forwardly offset relative to said first wheel by a distance of approximately five (5) inches.

* * * * *